(12) United States Patent
Ruddle et al.

(10) Patent No.: US 7,201,648 B1
(45) Date of Patent: Apr. 10, 2007

(54) METHOD OF PREPARING POULTRY DRUMSTICK FOR FRYING, AND FOOD PRODUCT THEREFROM

(76) Inventors: Randall L. Ruddle, 205 Squirrel Haven, Mary Esther, FL (US) 32569; Brenda LaFountain, 1265 Shore Dr., Unit 41, Destin, FL (US) 32550

( * ) Notice: Subject to any disclaimer, the term of this patent is extended or adjusted under 35 U.S.C. 154(b) by 739 days.

(21) Appl. No.: 10/702,311

(22) Filed: Nov. 7, 2003

(51) Int. Cl.
*A22C 21/00* (2006.01)

(52) U.S. Cl. ..................................... 452/198

(58) Field of Classification Search ........ 452/135–138, 452/109, 198, 166–169, 125, 127; 426/644, 426/518, 134
See application file for complete search history.

(56) References Cited

U.S. PATENT DOCUMENTS

| | | | | |
|---|---|---|---|---|
| 3,615,692 A | * | 10/1971 | Lovell | 426/282 |
| 3,840,681 A | * | 10/1974 | Bissett | 426/134 |
| 5,286,229 A | * | 2/1994 | Gagliardi, Jr. | 452/169 |
| 5,297,984 A | | 3/1994 | Gagliardi, Jr. | |
| 5,976,004 A | * | 11/1999 | Hazenbroek | 452/136 |
| 6,428,838 B1 | | 8/2002 | Gagliardi, Jr. | |

* cited by examiner

*Primary Examiner*—Thomas Price
(74) *Attorney, Agent, or Firm*—William B. Bell

(57) ABSTRACT

The disclosure teaches a method of preparing a poultry drumstick, particularly chicken drumsticks, for cooking, and the food product produced therefrom. Chicken drumsticks, featuring a centrally disposed elongated bone between a thigh end and a foot end, including a quantity of meat surrounding the bone. The method comprises the steps of making an annular cut about the bone, followed by making a pair of opposing vertical cuts along the bone, from the annular cut, and through the meat to define two essentially equal sections. Thereafter, the two sections are peeled downwardly away from the bone and brought together to form a ball of meat. Before cooking, any skin may be removed such as by twisting and separating the skin therefrom.

8 Claims, 3 Drawing Sheets

METHOD OF PREPARING POULTRY DRUMSTICK FOR FRYING, AND FOOD PRODUCT THEREFROM

FIELD OF THE INVENTION

This invention is directed to the field of food processing poultry products, more particularly to a method of preparing a poultry drumstick for frying, and to a uniquely shaped food product produced therefrom.

BACKGROUND OF THE INVENTION

The present invention relates to a method of preparing a poultry drumstick, in preparation for baking or frying, and to the food product produced therefrom exhibiting a ball of meat at one end of the drumstick bone, where the bone forms a handle for convenient consumption of the food product.

American tastes in meat products have developed and been refined over many years such that poultry and fowl have become a major staple of America's diet. Even the traditional beef eateries offer chicken, for example, in some form or another. Unfortunately, little has changed over these years in the manner by which chicken is prepared and served. Chickens are conventionally eviscerated and dressed and sold either as a whole or as severed parts, namely, breasts, thighs, wings, and drumsticks, where the latter are typically sold with the skin in place and with the meat surrounding a central elongated bone.

In the past several decades, there has been an increasing demand for meat products which require less time for preparation and are boneless or partially boneless, making such products easier to consume. Hence, products such as boneless chicken breasts, chicken tenders, etc., have enjoyed tremendous commercial success. Other bird parts, such as wings, have enjoyed an increase in popularity because of the development of new and different preparation methods and/or marketing techniques, i.e., "hot wings", "buffalo wings", etc. Until recently, some bird parts, such as thighs, and drumsticks, have not been amenable to such enhanced commercial processing and/or preparation methods for a variety of reasons related primarily to the size of the parts, the type of meat (dark versus light), the size and location of the bone, etc.

Two recent developments by Eugene D. Gagliardi, Jr., directed to methods for preparing poultry food products, such as different chicken parts, may be found in the following U.S. Patents:

a.) U.S. Pat. No. 5,297,984 which teaches a method of making a food product from the leg of a bird wherein the leg has a thigh end, a foot end, an elongated bone extending generally from the thigh end to the foot end, and meat surrounding and attached to the bone. The method comprises the steps of severing at least a first portion of the meat from the bone proximate the thigh end while leaving a second portion of the meat distal from the thigh end attached to the bone. The first portion of the meat is moved toward the foot end to expose a portion of the bone at least proximate the thigh end. At least part of the exposed portion of the bone is severed and removed. The first portion of the meat is then moved toward the thigh end so that the first portion of the meat extends outwardly from the remaining part of the bone to provide a leg food product which is boneless at its thigh end and includes a bone at its foot end; and b.) U.S. Pat. No. 6,428,838 related to a method of making a food product including: selecting a thigh of an animal, the thigh comprising a thigh bone at least partially surrounded with thigh meat, the thigh bone having a first end and a second end; and partially deboning the thigh causing the first end of the thigh bone to extend from the thigh meat to form a handle for holding the food product, the thigh meat being generally positioned proximate to the second end of the thigh bone after the partial deboning. A fun to eat food product is also detailed herein. The fun to eat food product is formed from an animal's thigh, including a thigh bone having a first end and a second end. Thigh meat having an overall generally elongated shape extends from the second end of the thigh bone and is generally secured thereto. A handle is formed by the first end of the thigh bone extending from the thigh meat.

The Gagliardi developments illustrate the consumer's desire to see new and different product forms for the traditional chicken parts, such as thighs and drumsticks, for example. However, the methods of preparing the different food products therefrom are complex and are not amenable to ease and convenience to achieve a tasty and unique food product. The manner by which the present invention presents a new method for preparing poultry drumsticks, particularly chicken, will become apparent in the description which follows, especially when read in conjunction with the accompanying drawings.

SUMMARY OF THE INVENTION

This invention is directed to a method or preparing a poultry drumstick, such as chicken, to develop a uniquely shaped food product featuring a bone handle with a ball of meat at the opposite end of the bone. The preferred method hereof comprises the steps of selecting a chicken drumstick, as known in the art, featuring a central elongated bone extending from a thigh end to a foot end, where the meat thereabout, with the skin in place, is principally found about the bone in proximity to the thigh end of the bone. To prepare the drumstick, an annular cut is made about the bone, essentially above the meat, with the removal of any skin from the foot end. Thereafter, two opposed vertical cuts are made through the meat from the annular cut toward and in proximity to the thigh end, to reveal two generally sections of meat clinging to the thigh end. The two sections are peeled away from the bone and brought into contact with one another into a balled shape below the thigh end. Finally, with the two sections brought together, with skin extending therefrom, the skin may be twisted to remove only the remaining skin. This prepared drumstick is now ready for cooking. By this method, a uniquely shaped, balled chicken drumstick is presented, where the essentially meat free bone end forms a convenient handle for consuming and enjoying the cooked drumstick, whether by deep frying, broiling, grilling, etc.

Accordingly, a feature of this invention is a method for preparing a uniquely shaped food product from a poultry drumstick.

A further feature hereof is the provision of an eatable drumstick, after cooking, having a meat free bone that functions as a handle during consumption of the food product.

Still another feature of the invention is a method that includes cutting and peeling two sections of the meat of the drumstick back upon themselves to form a ball of meat for easy consumption.

These and other features of the invention will become clearer from the specification and drawings which follow.

DETAILED DESCRIPTION OF PREFERRED EMBODIMENT

The present invention relates to a manual method of preparing a balled poultry drumstick, such as chicken, to fashion a uniquely shaped food product having a meat free bone handle for easy consumption. The method is directed to the various steps of preparing the food product, but it will be understood that a final step before consumption will be cooking, preferably by the well known processes of frying, baking, broiling and grilling.

Figure 1:
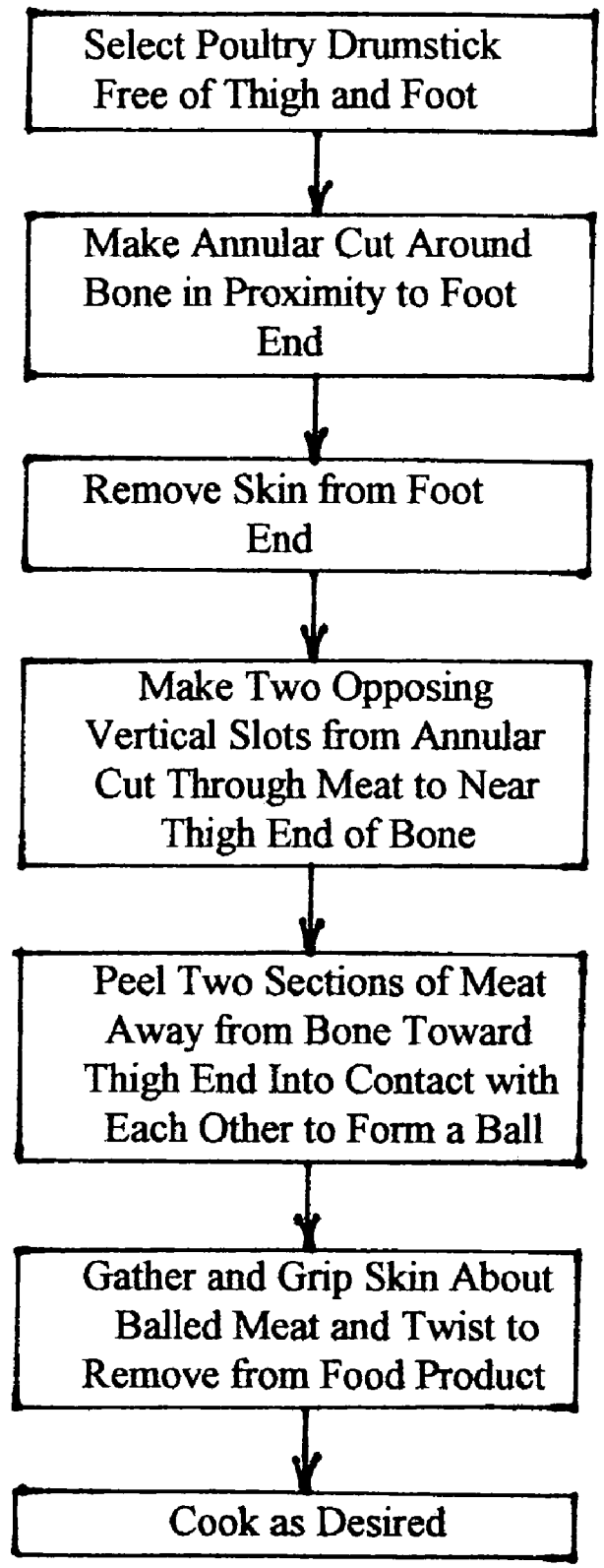
FIG. 1 is a sequential flow diagram, setting forth the various steps in preparing a poultry drumstick according to this invention, where the various steps are keyed to the remaining Figures for illustrative purposes.

The method of the invention will now be described with regard to the accompanying drawings, where FIG. 1 is a block diagram of the sequential steps of the method, and the remaining Figures illustrating the different steps of the method. In the drawings the same reference numerals represent common features throughout the various views Turning first to the preferred method set forth in a sequential and diagrammatic format in FIG. 1, where the obvious first step is to select a poultry drumstick, where chicken is the preferred food. As known in the art, a chicken drumstick is characterized by a central elongated bone extending between a thigh end, previously attached as a joint to the thigh bone, and a foot end, previously attached to the bird's foot. Surrounding the bone is a quantity of meat, typically covered with a skin. With the drumstick so selected, the balled food product is prepared as follows:

1. make an annular cut about the bone, such as by a cutting instrument, above the meat, in proximity to the foot end of the bone, and preferably removing the skin about the foot end;
2. make two vertical and opposing cuts or slots from the annular cut downwardly against the bone and through the meat, terminating at a position in proximity to the thigh end, whereby to form two essentially equal sections of meat;
3. peel the two sections of meat away from the bone toward the thigh end into intimate contact with one another to form a ball, where the stripped bone becomes a convenient handle for easy consumption;
4. remove skin that extends below the ball, such as by gripping and twisting; and,
5. cook as desired.

Turning now to the remaining Figures, namely FIGS. 2 through 5, there are illustrated the various steps sequentially listed above for the method of this invention. Initially, a dressed drumstick "D" is selected, where the drumstick "D" features a central elongated bone 10 having a foot end 12 and a thigh end 14, where the thigh end is surrounded by meat 16 and skin 18, see FIG. 3. The initial step is to make an annular cut 20 about the bone, essentially above the meat 16 to separate the skin about the foot end, and the meat. Next, a pair of vertical opposing cuts or slots 22 are made by a cutting instrument 23 from the annular cut 20 downwardly toward the thigh end, and stopped laterally of the thigh end 14 leaving some uncut meat 16' at the bottom, revealing a pair of sections 24.

Figure 3:
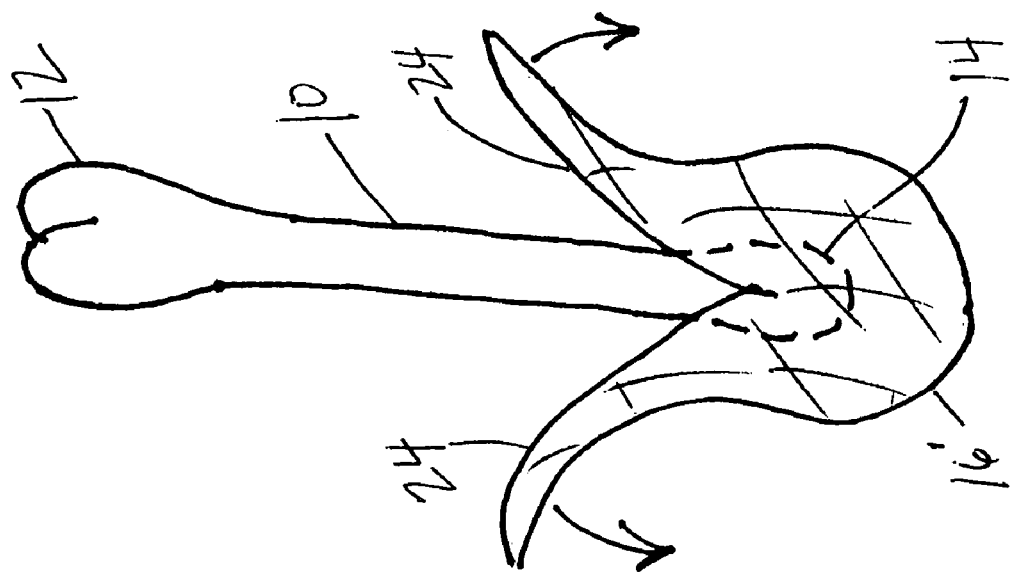
FIG. 3 is a plan view showing the fifth step of FIG. 1.
Figure 2:
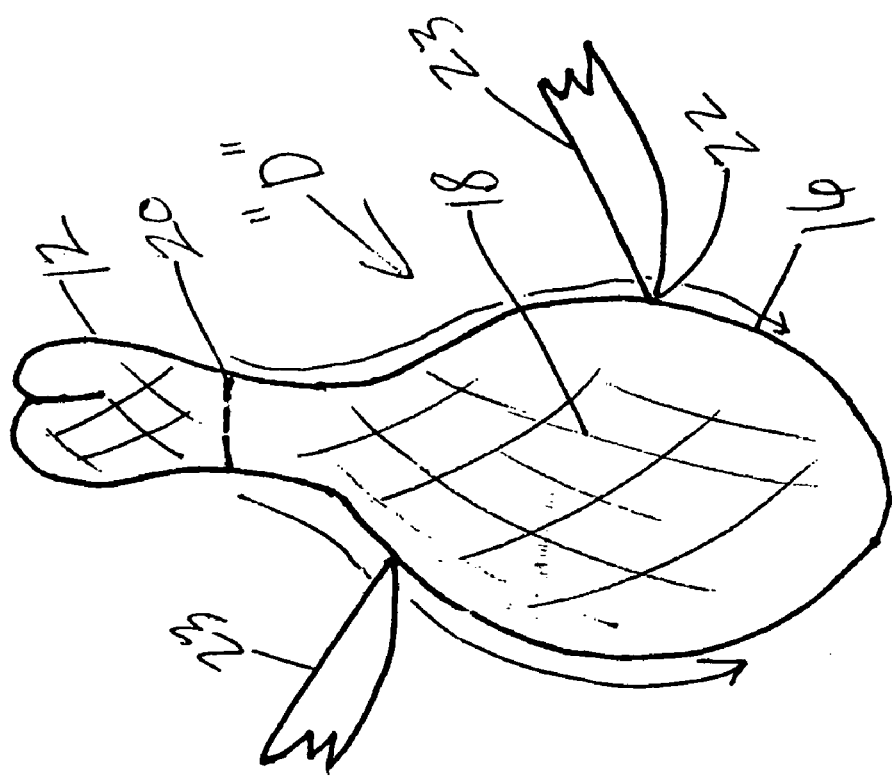
FIG. 2 is a plan view of a dressed drumstick showing the first four steps of FIG. 1 for the method of this invention.
Figure 5:
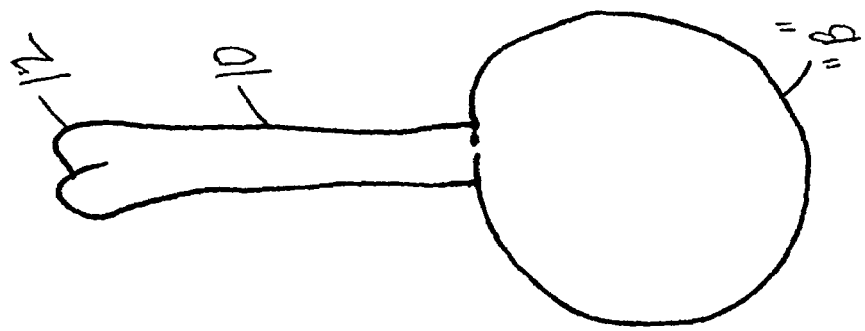
FIG. 5 is a plan view showing the sixth step of FIG. 1.
Figure 4:
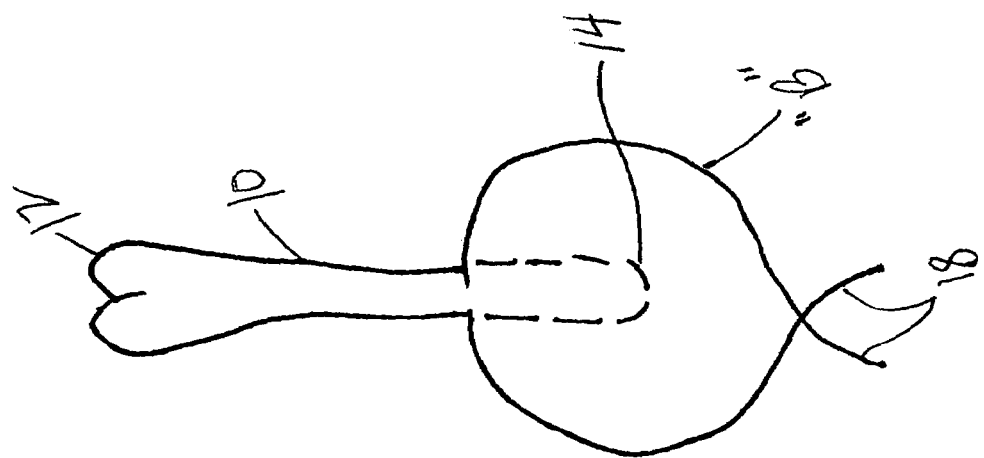
FIG. 4 is a plan view showing further features of the fifth step of FIG. 1.

As seen in FIG. 3, the two sections 24 are peeled away from the bone 10, exhibiting an essentially meat free bone, and pulled downwardly about the uncut meat 16' into contact with one another, see FIG. 4. A ball "B" of meat is formed with the bone 10 forming a convenient handle for consuming and enjoying the food product. Before cooking the food product, the skin 18, hanging down from the ball "B", may be removed by gripping and twisting off the excess skin. Thereafter, the food product may be cooked by a variety of processes, such as frying, i.e. deep frying, broiling, baking and even outdoor grilling.

It is recognized that changes, variations and modifications made be made to the method of this invention, especially by those skilled in the art, without departing from the spirit and scope thereof. Accordingly, no limitation is intended to be imposed thereon except as set forth in the accompanying claims.

We claim:

1. A method of making a balled food product, suitable for cooking, from the drumstick of poultry, where the drumstick is characterized by a central elongated bone having a thigh end and a foot end, with the thigh end surrounded by meat, said method comprising the steps of:
   a.) selecting said drumstick having skin about the meat and bone;
   b.) making an annular cut about said bone in proximity to said foot end thereof;
   c.) making two opposing vertical cuts through the meat from said annular cut to a position in proximity to said thigh end, whereby to form two sections of meat;
   d.) peeling said two sections away from said bone toward said thigh end into contact with one another to form a ball of meat; and,
   e.) removing said skin from said ball of meat.

2. The method of preparing a balled food product according to claim 1, including the step of removing said skin from said foot end after making said annular cut.

3. The method of preparing a balled food product according to claim 1, wherein the step of removing the skin from the ball of meat is accomplished by twisting said skin and separating same from said meat.

4. The method of preparing a balled food product according to claim 1, wherein the step of peeling said sections results in the meat being being turned inside out.

5. The method of preparing a balled food product according to claim 1, wherein the meat free bone functions as a handle for easy consumption thereof.

6. The method of preparing a balled food product according to claim 5, including the final step of subjecting said balled food product to cooking.

7. The method of preparing a balled food product according to claim 6, wherein said cooking step is selected from the processes of frying, broiling, baking and grilling.

8. The balled food product produced by the method according to claim 1.

* * * * *